Nov. 21, 1950　　　　H. H. TALBOYS　　　　2,530,588
SET-OFF DEVICE
Filed Nov. 12, 1947　　　　　　　　　　　　6 Sheets-Sheet 1
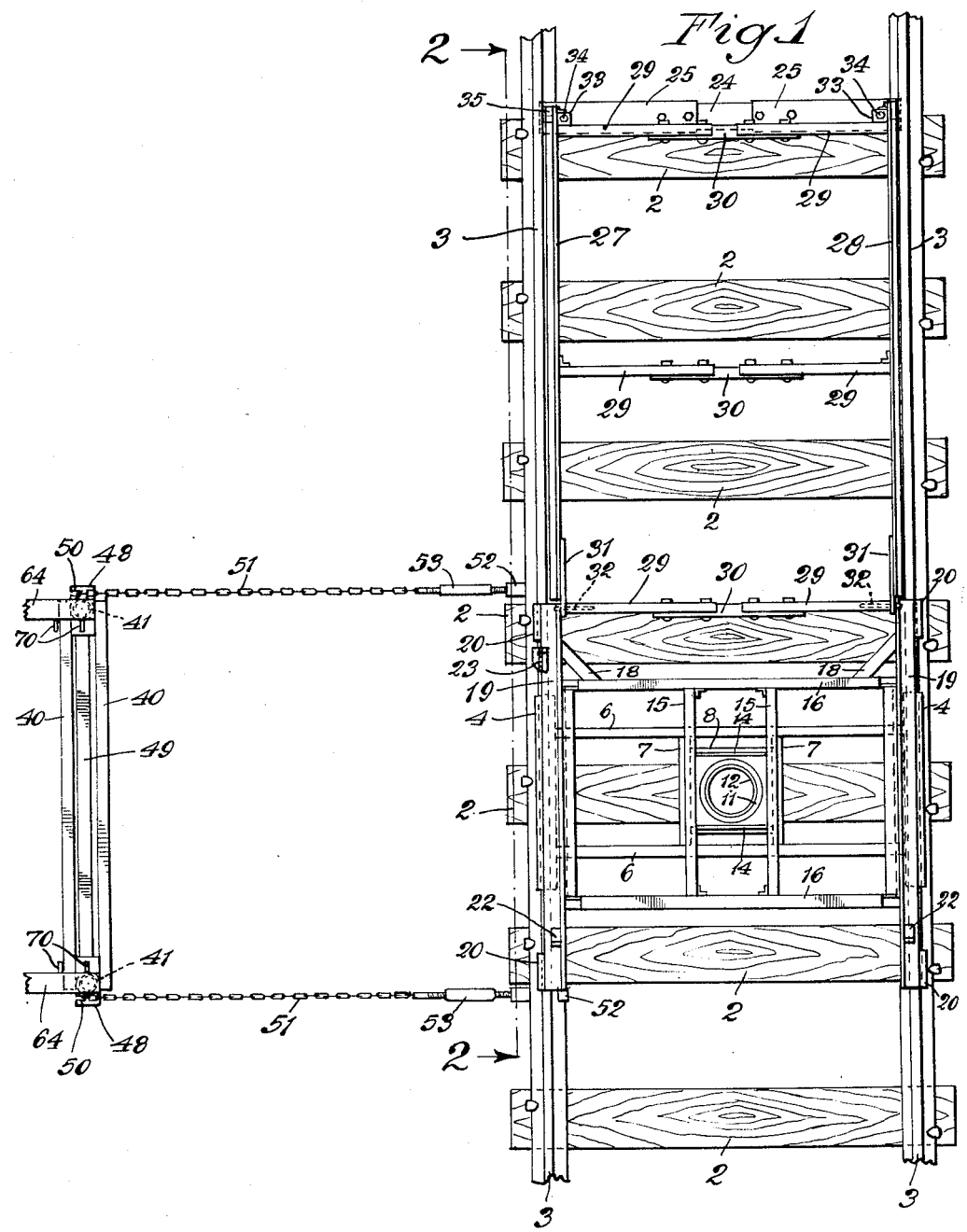
Inventor
Henry H. Talboys
by Parker & Carter
Attorneys Nov. 21, 1950     H. H. TALBOYS     2,530,588
SET-OFF DEVICE
Filed Nov. 12, 1947                                      6 Sheets-Sheet 2
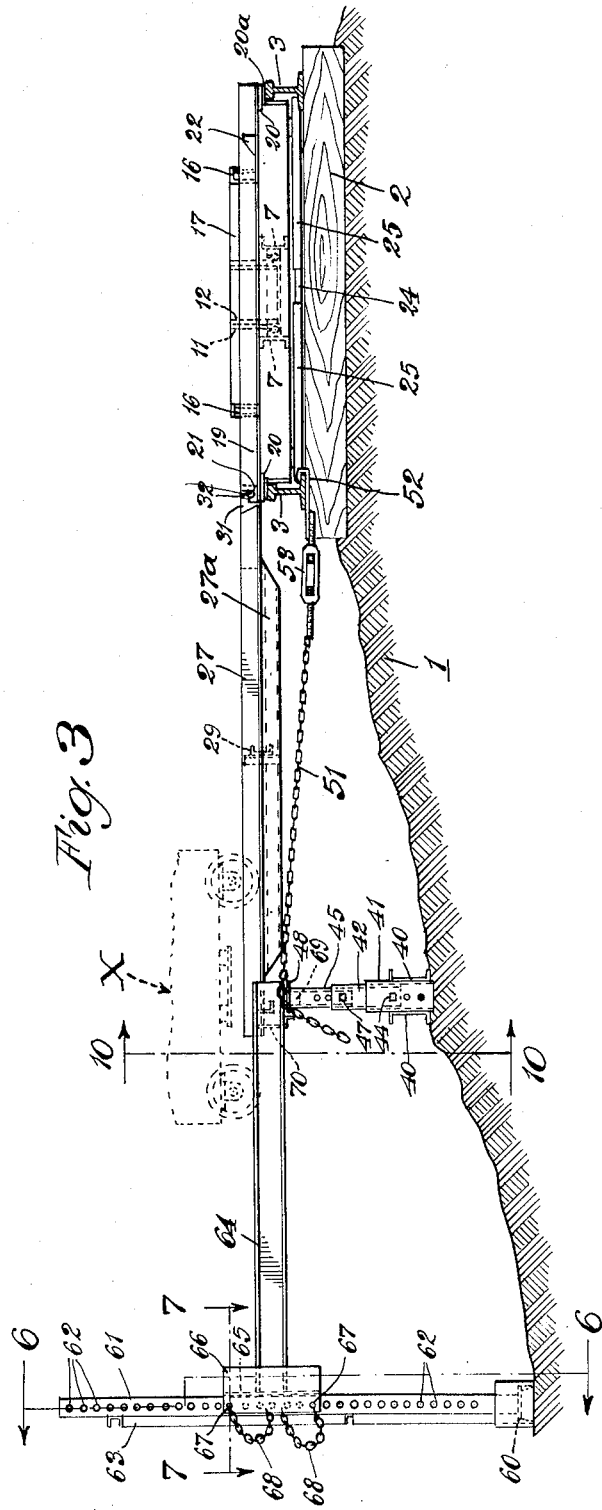
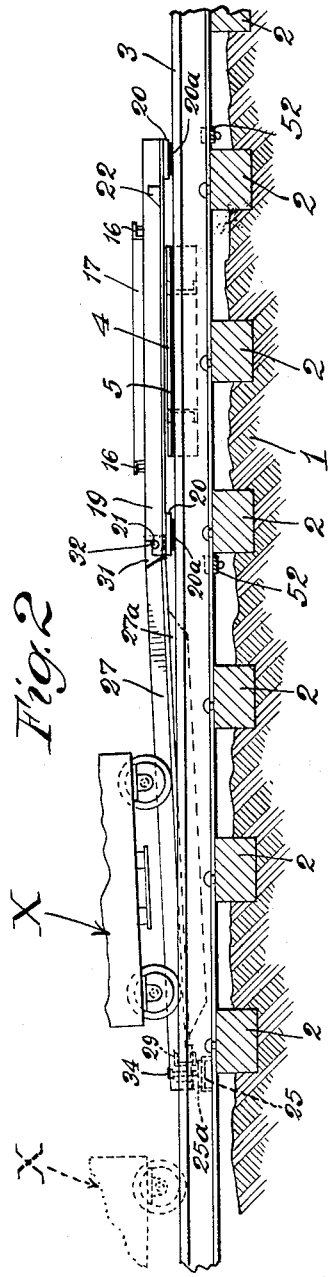
Inventor
Henry H. Talboys
by Parker Carter
Attorneys Nov. 21, 1950  H. H. TALBOYS  2,530,588
SET-OFF DEVICE
Filed Nov. 12, 1947  6 Sheets-Sheet 3

Inventor
Henry H. Talboys
by Parker & Carter
Attorneys.

Nov. 21, 1950   H. H. TALBOYS   2,530,588
SET-OFF DEVICE
Filed Nov. 12, 1947   6 Sheets-Sheet 4
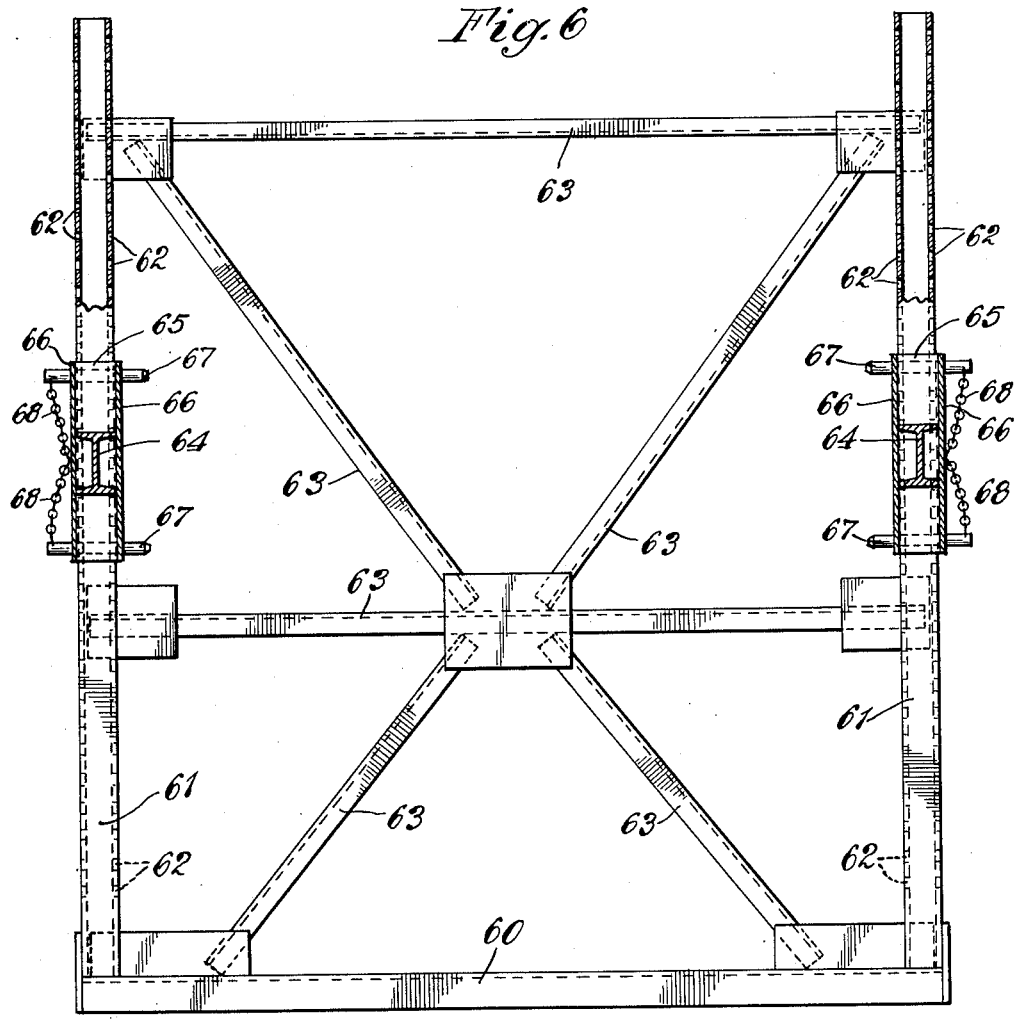
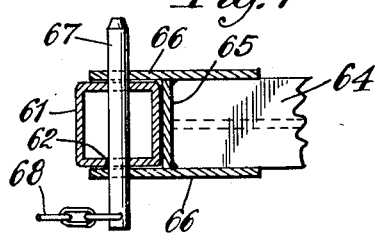
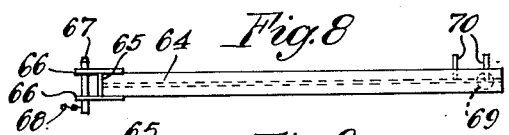
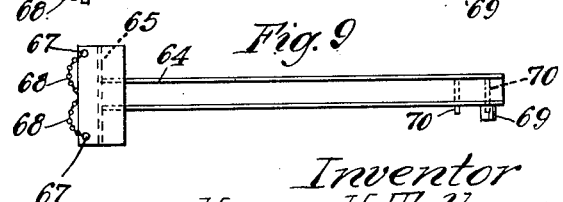
Inventor
Henry H. Talboys
by Parker & Carter
Attorneys Nov. 21, 1950    H. H. TALBOYS    2,530,588
SET-OFF DEVICE
Filed Nov. 12, 1947    6 Sheets-Sheet 5
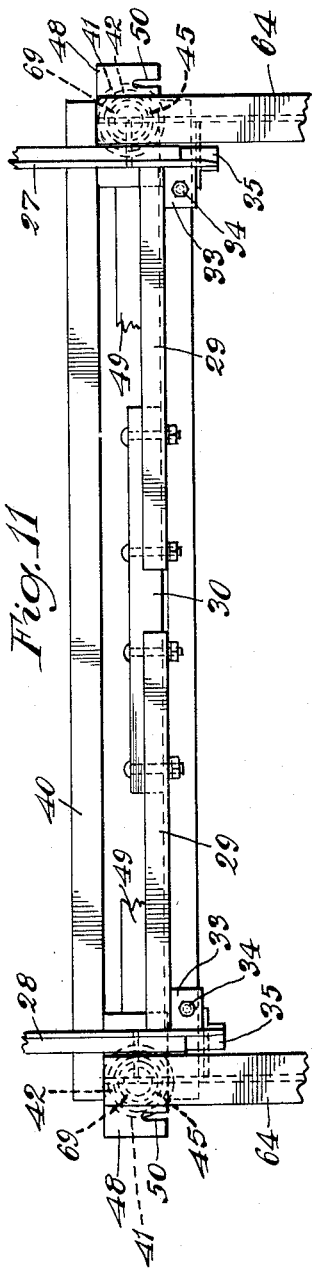
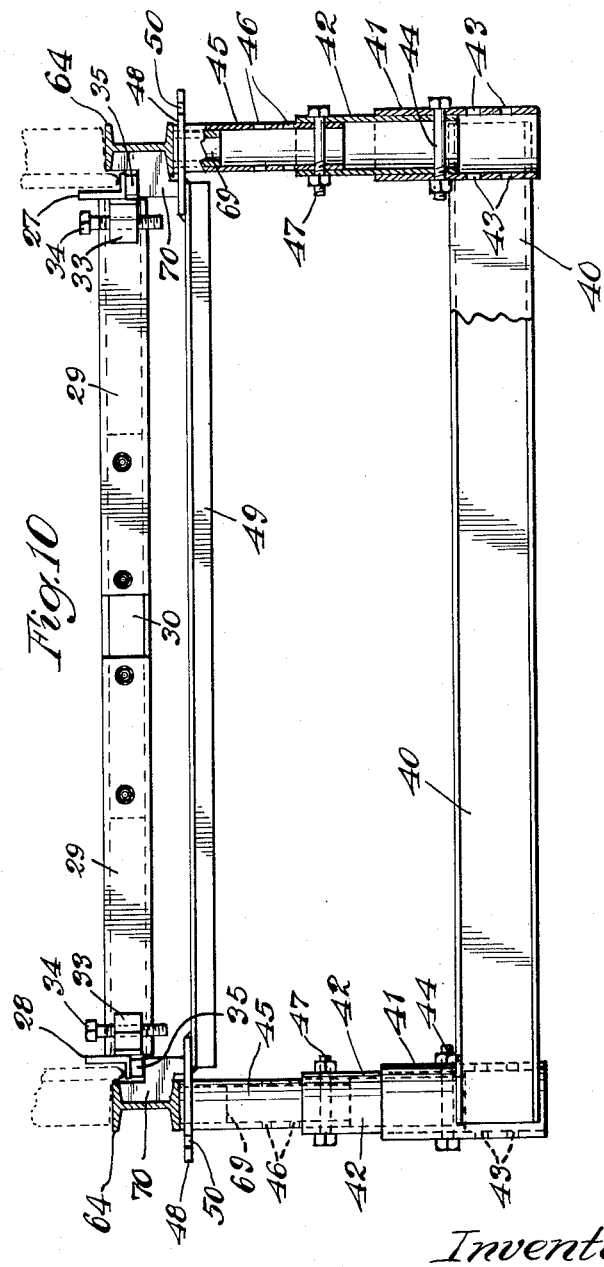
Inventor
Henry H. Talboys
by Parker + Carter
Attorneys Nov. 21, 1950    H. H. TALBOYS    2,530,588
SET-OFF DEVICE
Filed Nov. 12, 1947    6 Sheets-Sheet 6
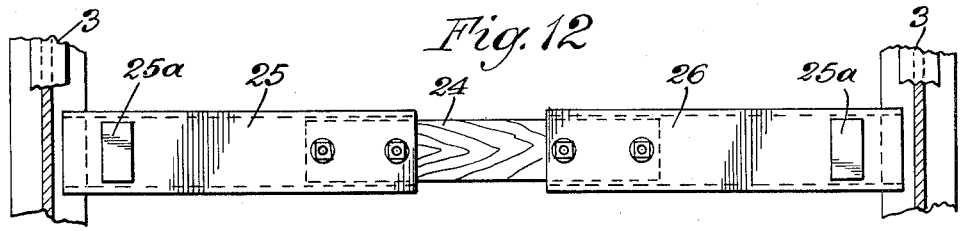
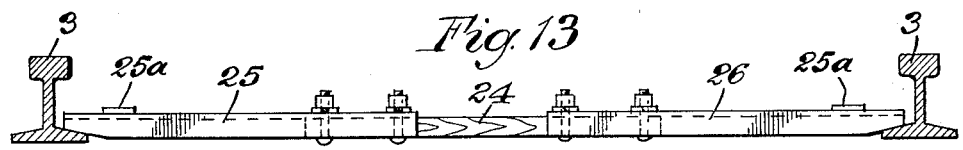
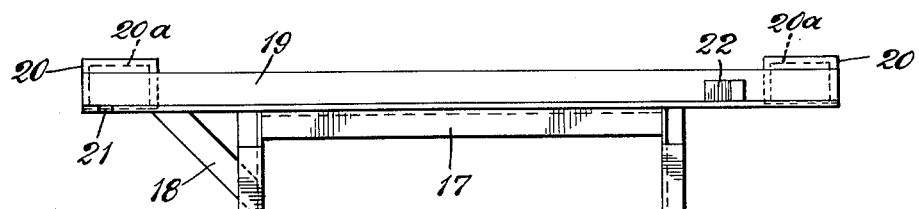
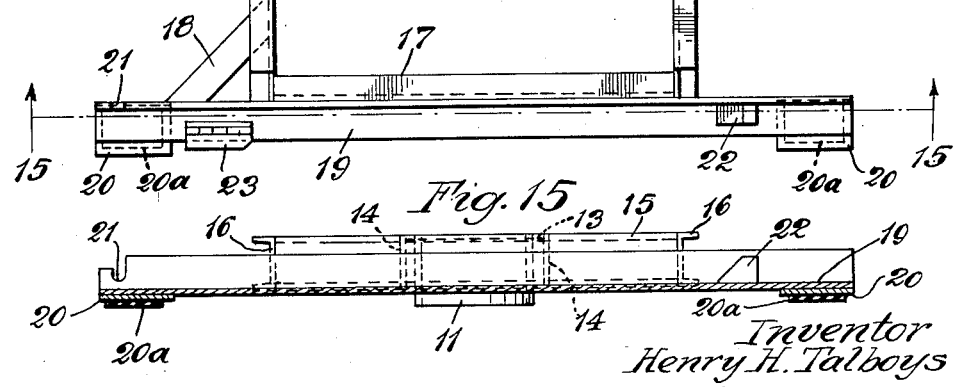
Inventor
Henry H. Talboys
by Parker & Carter
Attorneys Patented Nov. 21, 1950

2,530,588

UNITED STATES PATENT OFFICE 2,530,588

SET-OFF DEVICE

Henry H. Talboys, Milwaukee, Wis., assignor to Nordberg Manufacturing Company, Milwaukee, Wis., a corporation of Wisconsin Application November 12, 1947, Serial No. 785,281

4 Claims. (Cl. 104—45)

My invention relates to an improvement in take-off devices available for railroad use, and has for one purpose to provide means for readily and quickly removing heavy track working equipment from the rails of a track, to permit the passage of trains.

Another purpose is to provide improved take-off means for the removal of rail-supported track working equipment.

Another purpose is to provide take-off means which include rails for supporting the equipment after it has been removed from the rails of a track.

Another purpose is to provide an improved take-off means which needs a minimum number of men to operate it.

Another purpose is to provide a take-off means of minimum weight and cumbrousness.

Another purpose is to provide a take-off means in which no power elevator is necessary, and in which the unit to be removed is elevated only by running it along slightly inclined rails.

Other purposes will appear from time to time in the course of the specification and claims.

I illustrate the invention more or less diagrammatically in the accompanying drawings wherein:

Fig. 1 is a plan view with parts broken away, showing the parts in the position for receiving the unit prior to its elevation and removal;

Fig. 2 is a section on the line 2—2 of Fig. 1;

Fig. 3 is a vertical transverse section illustrating the removal of the unit;

Fig. 6 is a section on an enlarged scale on the line 6—6 of Fig. 3;

Fig. 7 is a section on an enlarged scale on the line 7—7 of Fig. 3;

Fig. 8 is a plan view of the rail shown in Fig. 3;

Fig. 9 is a side elevation of the rail shown in Fig. 8;

Fig. 10 is a section on an enlarged scale on the line 10—10 of Fig. 3;

Fig. 11 is a partial plan view of the structure shown in Fig. 10;

Fig. 12 is a plan view of the take-off rail support;

Fig. 13 is a side elevation of the structure of Fig. 12;

Fig. 14 is a plan view of the revolving frame used to turn the unit for removal; and Fig. 15 is a section on the line 15—15 of Fig. 14.

Like parts are indicated by like symbols throughout the specification and drawings.

Figure 4:
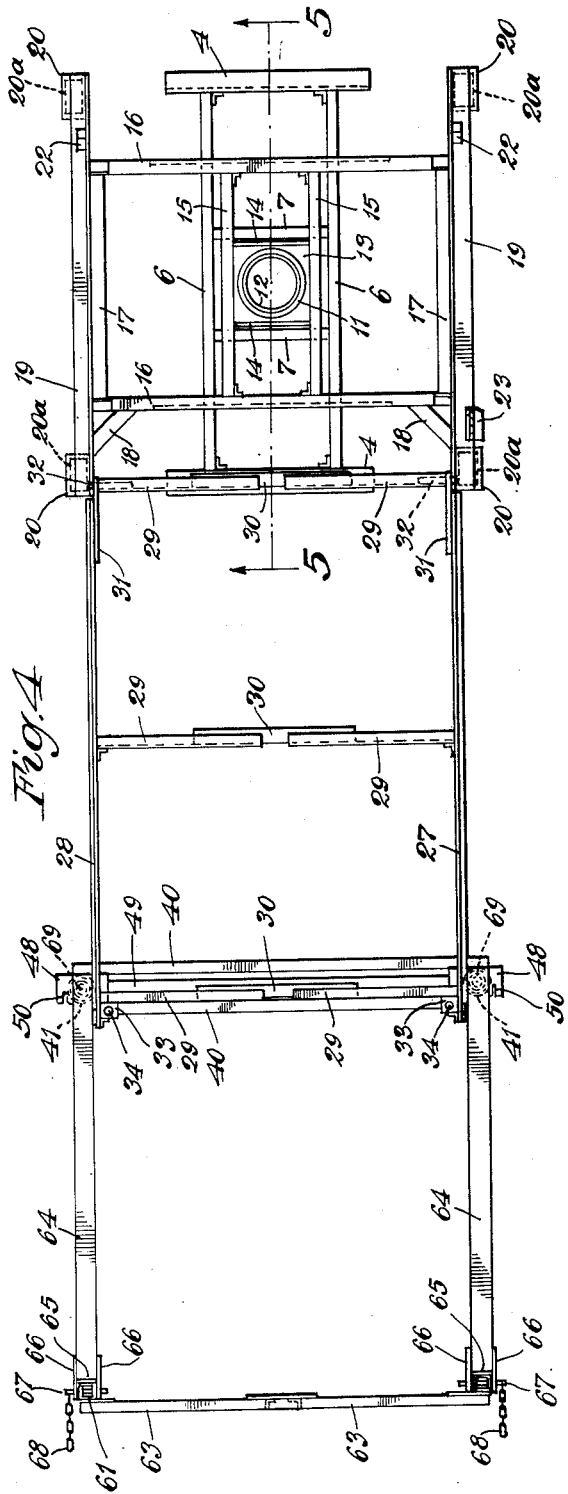
Fig. 4 is a plan view of the structure shown in Fig. 3, with the track rails omitted.

Referring to the drawings, 1 generally indicates the ground along the right-of-way. 2 indicates a tie and 3, 3 track rails secured to the tie.

Figure 5:
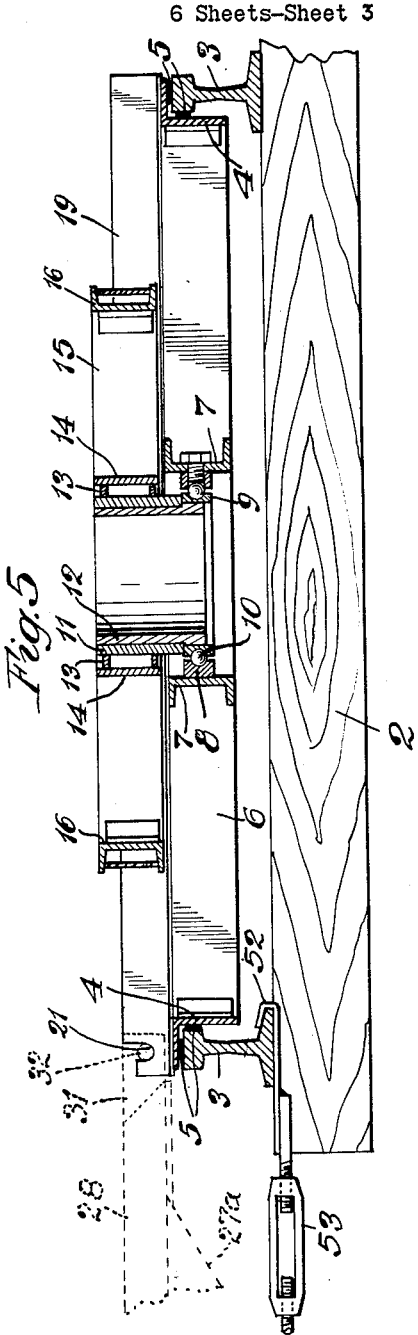
Fig. 5 is a section on an enlarged scale on the line 5—5 of Fig. 4.

Referring for example to Figs. 4 and 5, it will be understood that when the track is to be cleared, the track working equipment to be removed must be taken from the rails 3 and transported to some lateral point. I provide a rail spanning unit having along each side a rail-engaging angle 4 provided with suitable rail-engaging insulating blocks 5. The angles are connected by transversely extending frame members or angles 6 which in turn are connected by reinforcing channels 7. Supported within the space surrounded by the members 6 and 7, as shown in Figs. 4 and 5, is an outer ball race 8. Within it is an inner ball race 9, the two races having any suitable channels to receive balls 10. It will be understood that this showing may, if desired, be taken as diagrammatic, as the details may be widely varied. However, I do provide adequate turn table means, by means of which the track working equipment, or the equipment to be removed laterally from the track, may be rotated by the vertical axis of the above described ball race. In Fig. 5, I illustrate a double sleeve 11, 12, secured within plates 13, which in turn are held between cross pieces 14 which form part of a frame structure including members 15, 16 and 17, suitably braced by braces 18 and carrying any suitable wheel engaging equipment removing tracks or angles 19, 19. These angles are provided with pads or supports 20 having members of insulating material 20a at their bottoms, which may touch or rest upon the tops of the track rails 3, when the parts are in one position. As will be seen in Figs. 14 and 15, the tracks 19 may be notched at their ends as at 21, for a purpose which will later appear. They also are shown as carrying limit stop 22, opposite the ends which carry the notches 21. 23 is a hinged locking piece.

Assume that the above described parts have been laid in position on the rails 3, as shown in Figs. 1 and 2, prior to the removal of the equipment indicated as X. The next step is to move the equipment X upon the rails 19. This is done as follows: The rail spanning member shown in Figs. 12 and 13 is applied between the rails 3 in the position in which it is shown in Fig. 1. I illustrate it as including an intermediate wood or suitable insulating piece 24, to which are connected end pieces 25, 26, shown as resting on the lower or base flanges of the rails 3. The members 25, 26, carry top pads or reinforcements 25a, the purpose of which appears below. Positioned to span the ends of the tracks or angles 19 and the above described cross supports 24, 25, 26 are a pair of rails or ramp elements 27, 28, suitably connected by cross members 29, each of which has an intermediate insulating member 30. The ramp tracks 27, 28 are shown as having an extension plate 31 carrying pins 32 which drop into the notches 21 of the rails 19. At the outer ends the ramp ends 27, 28 carry blocks 33 through which pass adjusting screws 34 which rest upon the above described pads 25a. This is necessary in order that the ramp rails may be adjusted to different sizes or heights of the track rails. It will be noted as in Fig. 10 that the ramp rails are formed to receive the car wheel flanges, the wheel and flange structure being shown in Fig. 10. Beneath the ends of the ramp rails 27, 28 I illustrate supporting or reinforcing blocks 35.

It will be understood that the equipment to be moved is rolled along the track rails 3 until the ramp rails are engaged by the wheel flanges. The equipment is then rolled up the ramp rails 27, 28, until the car wheels engage the rails 19 and may, if desired, abut against the stops 22. The lock 23 may then be moved up into locking position and the equipment is held against movement along the rails 19. The operators then remove the ramp rails 27, 28 from the track rails. This may be done by elevating the outer ends of the ramp rails or the frames of which they form part. The central carriage may then be rotated into the position in which it is shown in Figs. 3 and 4. The ramp rails 27, 28 then constitute a species of bridge, and it will be noted that they are suitably reinforced as at 27a in Fig. 3. In order to support the outer ends of the ramp rails 27, 28, I illustrate a supporting structure including bottoms or cross pieces 40 which receive at their ends sleeves 41 within which are telescopically adjustable intermediate sleeves 42, for example, by apertures 43 and securing pins or bolts 44. Telescopic within the intermediate sleeves 42 are upper sleeves 45 with their adjusting apertures 46 formed to receive adjusting bolts or pins 47. Positioned at the upper ends of the sleeves 45 are brackets 48 which are connected by a cross piece or spacing member 49 and which are provided with notches 50 adapted to receive a securing or limit chain 51, the inner end of which is shown as adjustably secured to the hook 52 by means of a turn buckle 53.

I also provide an outer support having a bottom member 60, an end vertical 61 shown as rectangular in cross section provided with a plurality of adjusting apertures 62. The parts may be centered and cross-braced by any suitable braces generally indicated as 63. Adjustable vertically along the members 61 are outside rails or I beams 64. Each such I beam has at its outer end a vertical plate 65 and parallel side plates 66, which define a space surrounding one of the verticals 61 on three sides. The plates 66 are apertured to receive any suitable cross pins 67, of which two are shown for each rail, connected by retaining chains 68. At the opposite end of the I beams or tracks 64 I illustrate a plug 69 adapted to enter the top of one of the sleeves 45. Each track is also provided with a pair of inwardly extending plates 70, for receiving the blocks 35 at the ends of the ramp rails 27, 28. Thus the entire structure is firmly but demountably secured together, in the position in which the parts are shown in Fig. 3. The work elements or track equipment X can, as shown in Fig. 3, be rolled outwardly from the track rails 3. It may be positioned at the full limit of its movement, where its weight is supported by the I beams 64, it being located between the inner and the outer supports above described. The operators, when the member X has been removed to the end of its possible movement, then lift the ramp rails 27, 28 to a safe position at the side of the rails 3. They then remove the track spanning turn table, of which the rails 19 form part. This clears from the rails all parts which would interfere with the passage of a train and the train may pass.

It may be advantageous to slant the rails 64 slightly downwardly and outwardly away from the track. In any event, after the train has passed, the operators may replace the track spanning turn table structure and may be connected by the ramp rails 27, 28 to the outwardly positioned supporting rails 64. The track is then moved back upon the turn table. Then the ramp rail is freed at its outer end from the adjustable support, and is rotated back into the position in which it is shown in Fig. 1. The operators then move the track working equipment down the ramp rails and upon the track rails 3, where it is free to perform its desired function.

It will be noted that all of the parts of the above described assembly are sufficiently light to be moved by a relatively small track crew. There is no part which cannot be moved and actuated by two men at the most. The result is that the above described assembly can be quickly put into operative position, and just as quickly demounted. Thus, very heavy track working equipment may be removed from the rails of a track to a safe position at the side of the track, without heavy machinery, and with a small crew. For example, no overhead cranes are necessary, and no fixed or heavy equipment.

It will be noted that the operation is somewhat simplified by the fact that some of the rails amply receive the generally cylindrical bearing surface of the wheel, whereas others, such as the ramp rails 27, 28, and the turn table tracks 19, receive the outwardly extending flanges of the wheel.

It will be realized that whereas I have described and claimed a practical and operative device, nevertheless many changes may be made in size, shape, number and disposition of parts without departing from the scope of my invention.

The use and operation of my invention are as follows:

Track working equipment of substantial weight may be used on railroad tracks and may be supported and conveyed along the rails of a railroad track. As examples, I may mention cribbing machines and other machines which operate on the ballast or along the right-of-way of a railroad track. It is frequently important to remove such equipment. A problem is presented by the fact that while the equipment may be heavy, the operating crew may be small in numbers, and the equipment may be used at points removed from railroad cranes or overhead handling material. The structure herein shown can be assembled and operated quickly and efficiently by a small crew. The basic member or turn table which is shown as spanning the rails of the railroad track is of such weight that it can be easily handled by two, or at the most by three men. All of the other elements are substantially lighter and are formed for easy handling and for quick adjustment. No power elevation or jack elevation is necessary. Assuming that the crew wishes to remove the unit of track working equipment X laterally from the rails of the track, they apply the turn table unit to the rails, resting it upon the tops of the track rails 3. The ramp track frame is relatively light and serves at different times a triple purpose. When arranged along the rails 3 of the track, it serves as a ramp along which the piece of equipment X is moved until it is located in position along the side rails 19 of the turntable. It may then be used as a handle to rotate the turntable and the track equipment through an arc of 90°. It is then connected to the storage unit, and serves as a bridge across which the unit X is moved to the storage unit. Thereafter, it is disconnected from the turntable, and the turntable is removed for the passage of a train. After the train has passed, the above described functions or steps are reversed.

The turnbuckles 53 and the chain 51 perform an important function, not only in keeping the storage assembly from settling, but in pulling the assembly back into correct relation to the track, should it settle into the soft bank when released. It should be kept in mind that it is important to be able to remove the chains and turnbuckle assembly. This is especially the case at night, at which time the turnbuckle 53 and the chain 51 are customarily removed so that any trainmen may have clear passage along the track in the dark, in accordance with a railroad safety rule. When the unit is again put into use, for example in the morning after the turnbuckles and chains have been released for the night, the user can use the turnbuckle to pull the storage unit or assembly back into proper adjustment in relation to the track rails.

I claim:

1. In a take-off mechanism for track-working equipment, a readily removable base formed and adapted to be supported upon the two rails of a railroad track and span the space therebetween, a turntable on said base, located between the rails of the track to which the base is applied, the lowest portion of said base being adapted to be held by the track rails in a position below the tops of the rails and above the rail ties, said turntable being mounted for pivotal movement on said base, and including a pair of rails of the general gauge of the railorad track rails, adapted to be located above and overlying the track rails when in vehicle-receiving position, and adapted to receive and support the wheels of a vehicle riding along said railroad track rails, removable ramp rails between and alongside the track rails, adapted to connect said turntable rails with said railroad track rails when the turntable rails are aligned with said railroad track rails, each such ramp rail having an outer end portion adapted to extend along a corresponding track rail and including a wheel-flange-receiving portion located beneath the top of said rail and having an inner end portion removably secured to the turntable, at a level above the top of the track rail, in alignment with the rails on the turntable, a removable storage assembly adapted to be positioned to one side of the track, said assembly including vehicle-receiving rails of the general gauge of the railroad track rails, and means for firmly securing said ramp rails to and against endwise movement outwardly away from the ends of the rails of said removable vehicle storage assembly when the rails of said turntable are aligned with the vehicle-receiving rails of said storage assembly.

2. The structure of claim 1 characterized by and including a tension connection between the vehicle storage assembly and the track rails adapted to permit outward recession of the vehicle storage assembly from the track rails and to permit ready re-establishment of the proper spaced relation between said assembly and said rails.

3. The structure of claim 1 characterized by and including a flexible connector attached at one end to said storage assembly, a take-up member removably attached to the opposite end of said connector, and a removable connection between said take-up member and said track rails.

4. The structure of claim 1 characterized by and including removable ramp rails adjustably supported at one end between and upon the track rails and removably attached at their opposite ends to the turntable rails.

HENRY H. TALBOYS.

REFERENCES CITED

The following references are of record in the file of this patent:

UNITED STATES PATENTS

| Number | Name | Date |
|--------|------|------|
| 593,517 | Dansby | Nov. 9, 1897 |
| 890,659 | Kellner | June 16, 1908 |
| 1,311,770 | Pegram | July 29, 1919 |
| 1,590,534 | Mader | June 29, 1926 |
| 2,027,629 | Bowen | Jan. 14, 1936 |
| 2,117,077 | Bernard | May 10, 1938 |